US011986830B2

(12) United States Patent
Zions

(10) Patent No.: US 11,986,830 B2
(45) Date of Patent: May 21, 2024

(54) DEVICE FOR STORAGE AND TRANSPORT OF BIOLOGICAL SAMPLES

(71) Applicant: Research Foundation of the City University of New York, New York, NY (US)

(72) Inventor: Michael Zions, New York, NY (US)

(73) Assignee: Research Foundation of the City University of New York, New York, NY (US)

( * ) Notice: Subject to any disclaimer, the term of this patent is extended or adjusted under 35 U.S.C. 154(b) by 112 days.

(21) Appl. No.: 17/795,461

(22) PCT Filed: Jan. 27, 2021

(86) PCT No.: PCT/US2021/015290
§ 371 (c)(1),
(2) Date: Jul. 26, 2022

(87) PCT Pub. No.: WO2021/154853
PCT Pub. Date: Aug. 5, 2021

(65) Prior Publication Data

US 2023/0072135 A1 Mar. 9, 2023

Related U.S. Application Data

(60) Provisional application No. 62/966,300, filed on Jan. 27, 2020.

(51) Int. Cl.
*B01L 9/06* (2006.01)

(52) U.S. Cl.
CPC ........... *B01L 9/06* (2013.01); *B01L 2200/028* (2013.01); *B01L 2200/18* (2013.01); *B01L 2300/0803* (2013.01)

(58) Field of Classification Search
CPC .. B01L 9/06; B01L 2200/028; B01L 2200/18; B01L 2300/0803; B01L 3/5082; B01L 2200/185
See application file for complete search history.

(56) References Cited

U.S. PATENT DOCUMENTS

| | | | | |
|---|---|---|---|---|
| 3,005,282 | A | 10/1961 | Christiansen | |
| 4,628,705 | A | 12/1986 | Nave | |
| 4,932,533 | A | 6/1990 | Collier | |
| 5,031,779 | A * | 7/1991 | Szenay | A47F 7/14 211/41.12 |
| 5,058,397 | A | 10/1991 | MacDonald | |
| 5,176,264 | A * | 1/1993 | De Palma | G11B 33/0466 40/379 |
| 5,181,394 | A | 1/1993 | Schea, III et al. | |

(Continued)

OTHER PUBLICATIONS eppendorf.com; Eppendorf Storage Boxes; https://www.eppendorf.com/US-en/; 2019; 8 pages.

(Continued)

*Primary Examiner* — Shawn M Braden
(74) *Attorney, Agent, or Firm* — Peter J. Mikesell; Schmeiser, Olsen & Watts, LLP

(57) ABSTRACT

A device for storage and transport of biological samples. Multiple trays are assembled into a stack with sample tubes constrained between adjacent trays. The surface of each tray has radial grooves sized to hold the sample tubes. Each tray is secured to an adjacent tray with a bolt or snap-fit connector.

16 Claims, 7 Drawing Sheets

(56) References Cited

U.S. PATENT DOCUMENTS

| | | | | |
|---|---|---|---|---|
| 5,225,165 | A | 7/1993 | Perlman | |
| 5,236,088 | A | 8/1993 | Dhority et al. | |
| 5,321,955 | A | 6/1994 | Leonard | |
| 5,385,397 | A * | 1/1995 | Chow | G11B 33/0483 211/163 |
| 5,415,282 | A | 5/1995 | Kienholz | |
| 6,206,493 | B1 * | 3/2001 | Sanchez-Levin | A47F 5/05 312/249.2 |
| 6,681,684 | B1 * | 1/2004 | Chen | A47G 19/02 211/133.4 |
| 6,837,386 | B1 * | 1/2005 | Kent | A47F 5/04 211/205 |
| 7,222,739 | B2 * | 5/2007 | DeNatale, Jr. | G11B 33/0461 |
| 8,210,373 | B2 * | 7/2012 | Liao | A47B 87/0246 211/144 |
| 9,297,499 | B2 | 3/2016 | Jimenez-Rios et al. | |
| 9,615,660 | B2 * | 4/2017 | Hogeback | A47B 49/004 |
| 10,964,844 | B2 * | 3/2021 | Lutgen | H01L 33/20 |
| 2002/0098528 | A1 | 6/2002 | Gordon et al. | |
| 2004/0217069 | A1 | 11/2004 | Columbus | |
| 2005/0037484 | A1 | 2/2005 | Staimer et al. | |

OTHER PUBLICATIONS

ISA/US; International Search Report for corresponding International Application PCT/US21/15290 dated Apr. 12, 2021; 7 pages.

* cited by examiner

DEVICE FOR STORAGE AND TRANSPORT OF BIOLOGICAL SAMPLES

CROSS-REFERENCE TO RELATED APPLICATIONS

This application claims priority to and is a non-provisional of U.S. Patent Application 62/966,300 (filed Jan. 27, 2020) the entirety of which is incorporated herein by reference.

BACKGROUND OF THE INVENTION

Biological samples, such as tissue samples or vaccines, are typically collected in small vials and preserved in liquid nitrogen (LN2) or dry ice. Sample tubes, typically "Eppendorf tubes," are generally stored in rectangular racks, with the racks then stored in a special freezer ("a minus 80 freezer"). These racks secure the samples only loosely, and they do not store efficiently inside a "minus 80" lab freezer. These freezers in turn are expensive to purchase, operate, and maintain, and internal space is at a premium.

More, standard racks are not compliant with many shipping regulations. Tubes must be handled, removed from racks and repacked into compliant containers. This introduces opportunity for mistakes, mislabeling, thawing and loss of material.

Sharing samples with other labs, domestic or overseas, requires compliance across several regulatory bodies. These constraints impose restrictive packaging requirements. Current packaging state-of-the-art permits about five Eppendorf tubes to be shipped per standard box. Shipping costs are often prohibitive, presenting a barrier to collaboration or outsourcing. For example, shipping one box from New York City, New York to Helsinki, Finland costs nearly $300, or $60 per sample. An improved system is therefore desired.

The discussion above is merely provided for general background information and is not intended to be used as an aid in determining the scope of the claimed subject matter.

SUMMARY

A device for storage and transport of biological samples is disclosed. Multiple trays are assembled into a stack with sample tubes constrained between adjacent trays. The surface of each tray has radial grooves sized to hold the sample tubes. Each tray is secured to an adjacent tray with a bolt or snap-fit connector.

In a first embodiment a device for storage and transport of biological samples is provided. The device comprising: a stack comprising at least a first tray and a second tray, each having a first surface with a first plurality of radial grooves and a second surface, opposite the first surface, with a second plurality of radial grooves, each radial groove terminating in a perpendicular groove that is perpendicular to a longitudinal axis of a corresponding radial groove in the plurality of radial grooves.

In a second embodiment, a tray for storage and transport of biological samples is provided. The tray comprising a first surface with a first plurality of radial grooves and a second surface, opposite the first surface, with a second plurality of radial grooves, each radial groove terminating in a perpendicular groove that is perpendicular to a longitudinal axis of a corresponding radial groove in the plurality of radial grooves.

This brief description of the invention is intended only to provide a brief overview of subject matter disclosed herein according to one or more illustrative embodiments and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1A:
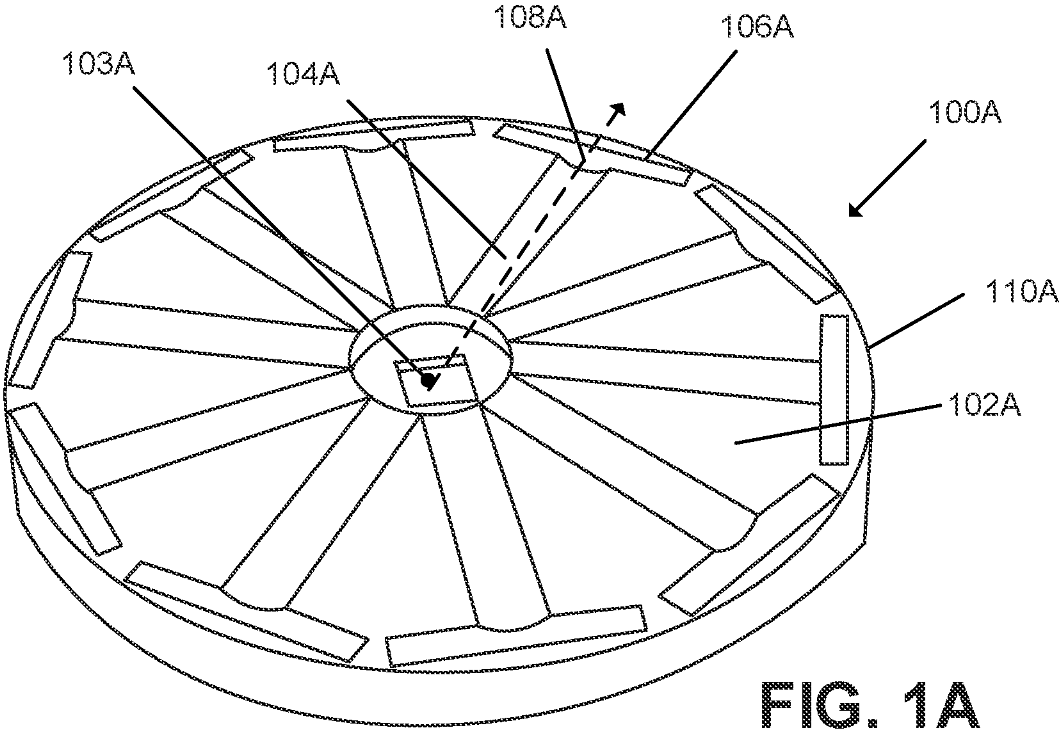
FIG. 1A is a perspective view of a first surface of a tray.

Referring to FIG. 1A, a tray 100A is shown. In the embodiment of FIG. 1A, the tray 100A is a circular tray. FIG. 1A depicts a first surface 102A with a plurality of radial grooves 104A that extend radially from a center point 103A of the tray 100A. The first surface 102A forms a planar top surface and the radial grooves 104A are embedded below this top surface. Each radial groove terminates in a perpendicular groove 106A that is perpendicular to the longitudinal axis 108A of its corresponding radial groove 104A. Each perpendicular groove 106A is located at a terminus of its corresponding radial groove 104A such that the perpendicular groove 106A is proximate a rim 110A of the tray 100A. In one embodiment, the perpendicular groove 106 is deeper than the radial groove 104A.

Figure 1B:
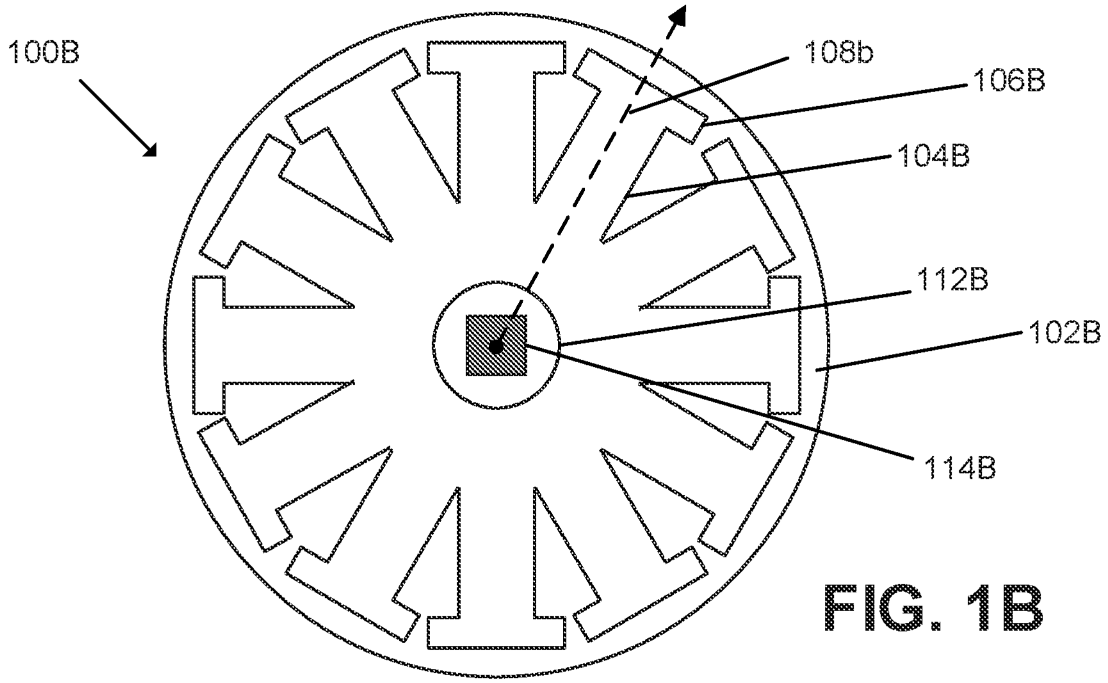
FIG. 1B is a plan view of the first surface of the tray.

FIG. 1B shows a plan view of a tray 100B that is substantially similar to tray 100A except in that tray 100A can hold twelve sample tubes on the first surface 102B of the tray 100B. The first surface 102B includes an indented recess 112B that may receive the head of a bolt such that the head is maintained below the first surface 102B. In the embodiment shown in FIG. 1B, the indented recess 112B is a circular indented recess. An indexed fastener is also present. In the embodiment of FIG. 1B, the indexed fastener is an indexed hole 114B that can receive a bolt. The indexed hole 114B comprises at least one flat edge such that the hole 114B is indexed to a corresponding flat edge of the bolt. The indexed hole 114B may be, for example, a square or hexagonal hole. The indented recess 112B and the indexed hole 114B are both disposed at the center point of the tray 100B and are coaxial with each other.

The radial grooves 104A, 106B and perpendicular grooves 106A, 106B are sized to receive a sample tube of predetermined dimensions, such as a standard-sized Eppendorf tube. The cap of the Eppendorf tube fits in the perpendicular grooves 106A, 106B while the body of the Eppendorf tube fits within the radial grooves 104A, 104B. The perpendicular grooves 106A, 106B permit tube lids to lock. The perpendicular grooves 106A, 106B use the tubes' lids as a structural member to prevent trays from rotating when stacked and to resist compression. The ability of the lids to prevent rotation simplifies the design of the stray and avoids the use of extra registration marks.

Figure 2A:
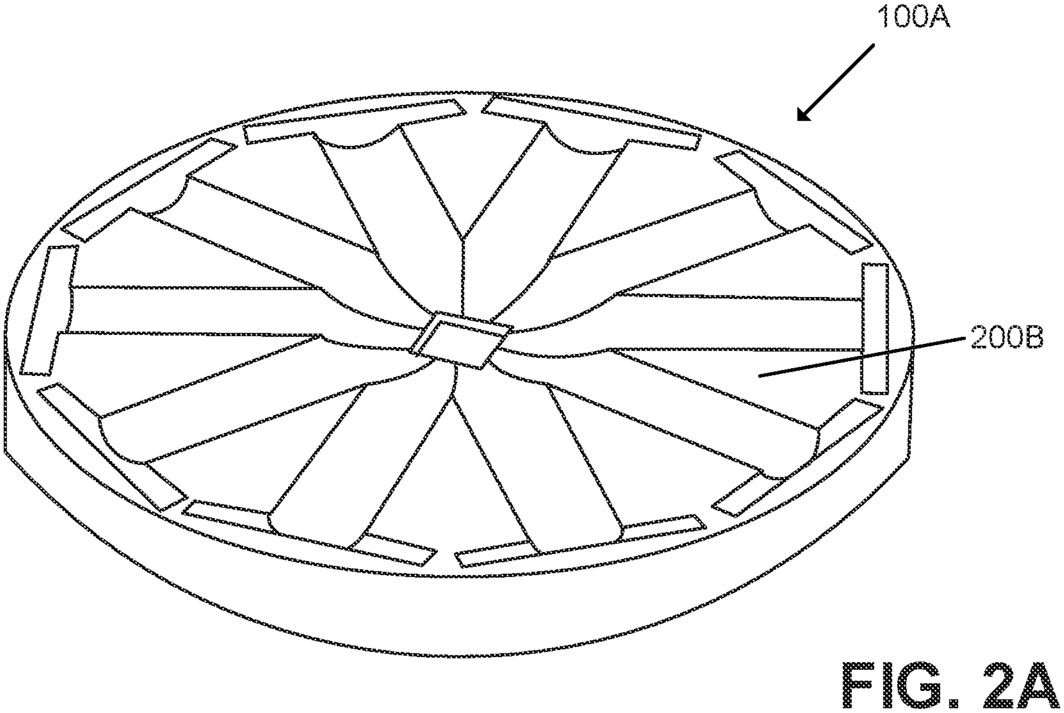
FIG. 2A is a perspective view of a second surface of the tray.
Figure 2B:
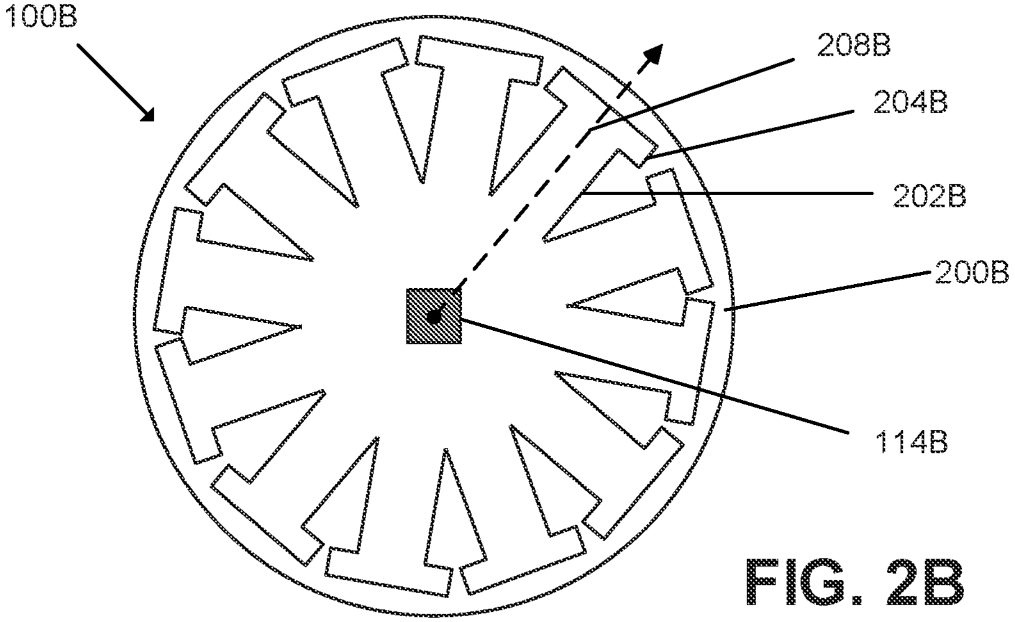
FIG. 2B is a plan view of the second surface of the tray.

FIG. 2A is a perspective view of a second surface 200A of the tray 100A. The second surface 200A is opposite the first surface 102A. FIG. 2B is a plan view of a second surface 200B of the tray 100B. In some embodiments, the area on the second surface immediately surrounding the indexed hole 114A or 114B is relatively flat such that a washer may be placed about the indexed hole 114A or 114B on the second surface. Such a configuration promotes the formation of stacks of trays, such as stack 500 (see FIG. 5A). In one embodiment, the second surface lacks an indented recess (such as indented recess 112B) although the inclusion of an indented recess on both sides is also an acceptable configuration.

The second surface 200B comprises a plurality of radial grooves 202B (each having a longitudinal axis 208B) and perpendicular grooves 204B that are substantially similar to the radial grooves 104B and perpendicular grooves 106B of the first surface 102B but differ in that the radial grooves 202B have been rotated relative to the indexed hole 114B. This rotation is more clearly illustrated in FIG. 3.

Figure 3:
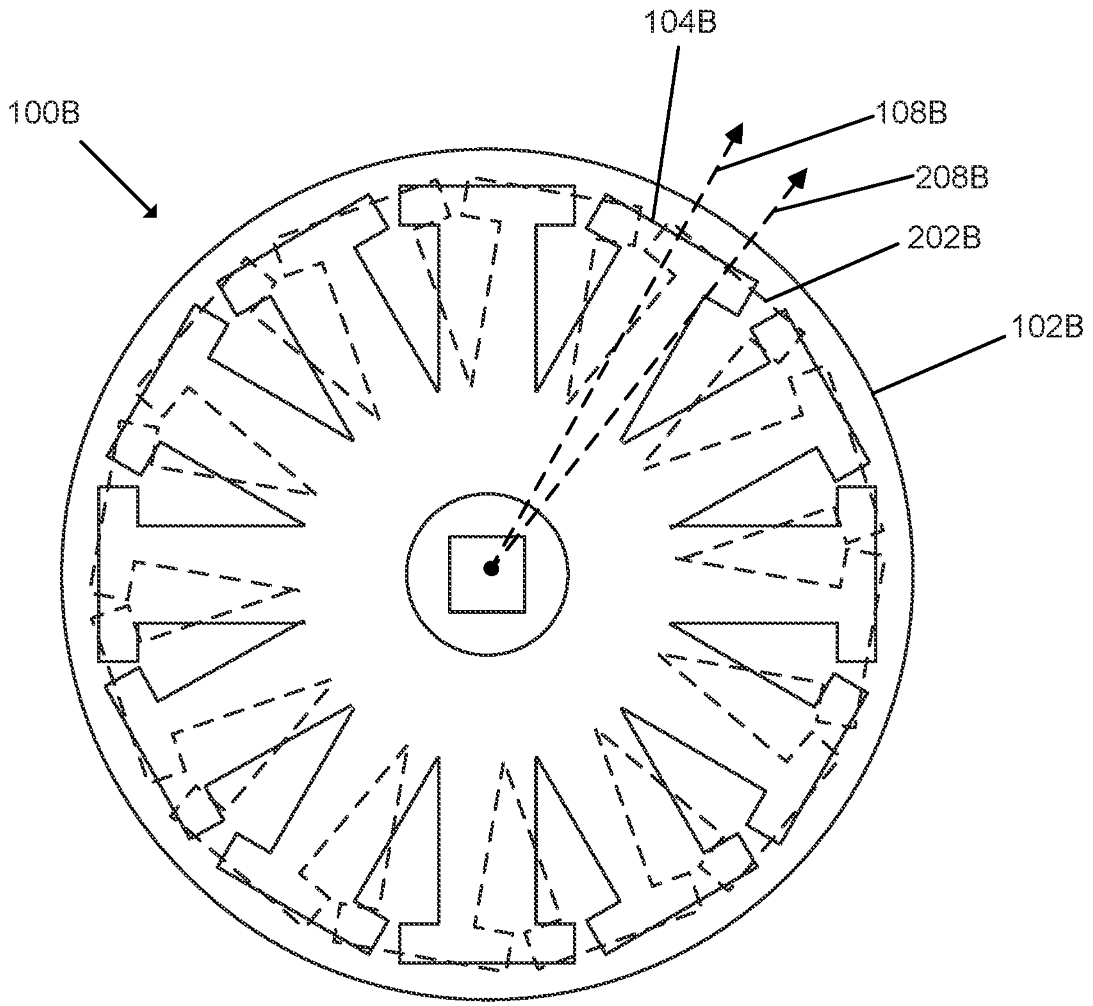
FIG. 3 is a plan view of the first surface of the tray wherein the radial grooves on the second surface are shown in broken line form.

FIG. 3 is a plan view of the first surface 102B of the tray 100B wherein the radial grooves 202B on the second surface 200B are shown in broken line form. One longitudinal axis 108B of a radial groove 104B on the first surface is shown. Likewise, one longitudinal axis 208B of a radial groove 202B on the second surface is also shown. Because the longitudinal axis 108B does not overlap with the longitudinal axis 208B, the corresponding radial grooves are vertically offset such that they do not vertically align.

The trays may be assembled into a stack using a repeating motif. A first tray has tubes set into its first surface then another tray is laid across the top of the tubes to provide a surface with exposed radial grooves. More tubes are placed into those exposed radial grooves and the process may be repeated.

Figure 4:
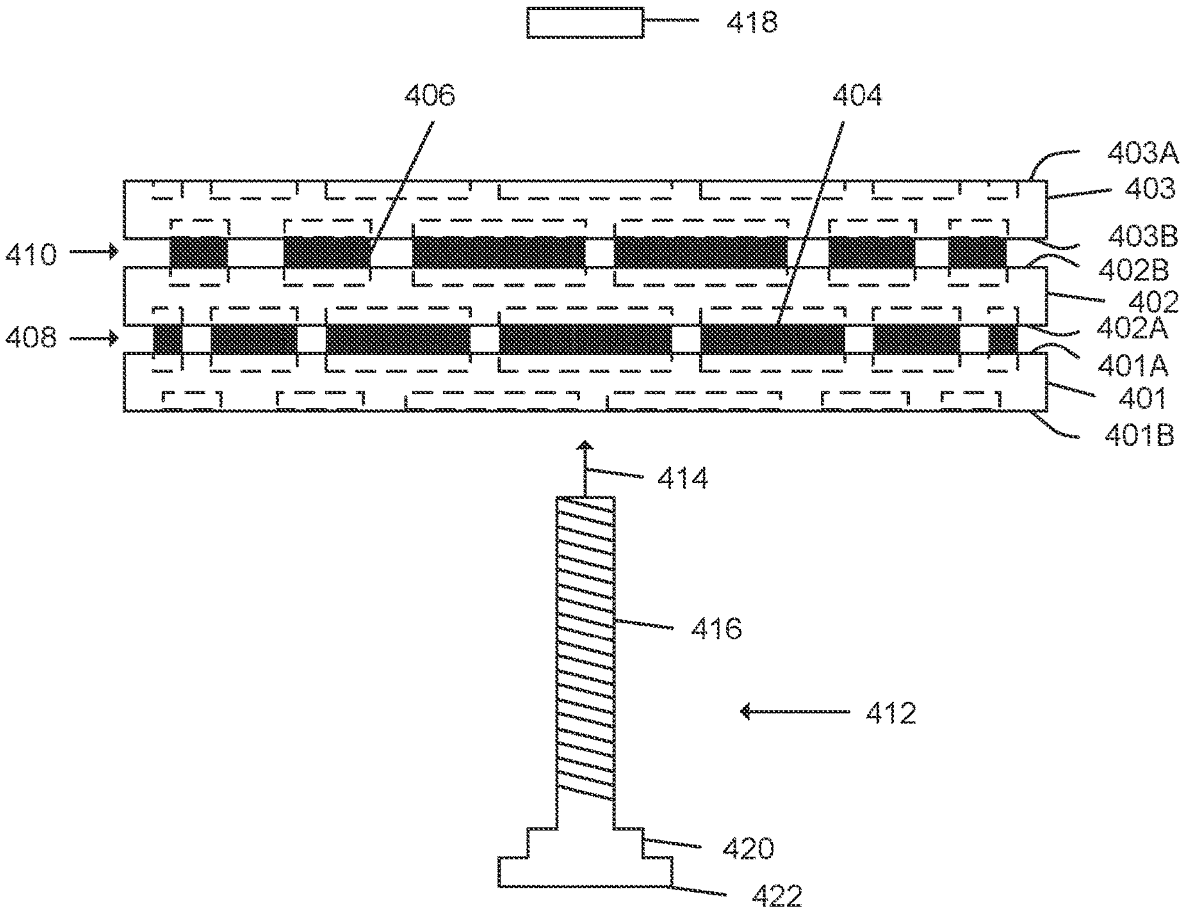
FIG. 4 depicts three trays in the process of forming a stack.

FIG. 4 depicts three trays including a first tray 401, a second tray 402 and a third tray 403. The first tray 401 has a first surface 401A and a second surface 401B. The second tray 402 has a first surface 402A and a second surface 402B. The third tray 401 has a first surface 403A and a second surface 403B. Sample tubes 404, 406 such as eppendorf tubes, are placed in the radial grooves and sandwiched between two of the tray. For example, a sample tube 404 may be sandwiched between the first surface 401A of the first tray 401 and the first surface 402A of the second tray 402. Likewise, a sample tube 406 may be sandwiched between the second surface 402B of the second tray 402 and the second surface 403B of the third tray 403. Because the radial grooves are offset from one another, the sample tubes in each of the layers 408, 410 are also staggered. Sample tubes in every other layer (e.g. all odd-numbered layers or all even-numbered layers) vertically stack with one another but the sample tubes within any two adjacent layers are vertically staggered.

As shown in FIG. 4, a bolt 412 (e.g. a carriage bolt) may be inserted in direction 414 through the indexed hole of each of the trays 401, 402 and 403. Threads 416 on the bolt 412 mate with a nut 418. The bolt has an indexed shank 420 that comprises at least one flat edge that engages the indexed hole such that the bolt 412 cannot rotate. In the indexed shank 420 may be, for example, a square or hexagonal indexed shank. The bolt 412 also has a head 422 that is wider than the indexed shank 420 that fits within the indented recess such that the head 422 is below the first surface of the respective tray. See FIG. 5A for a more detailed view.

Figure 5A:
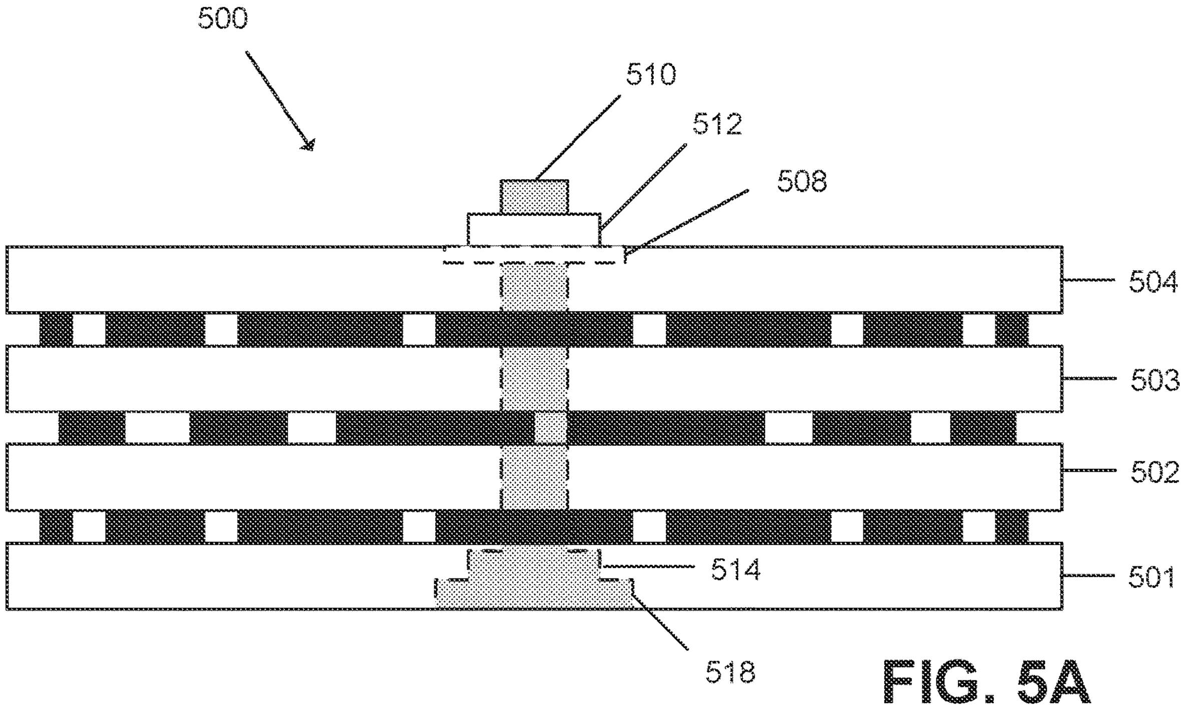
FIG. 5A is a sideview of the stack.
Figure 5B:
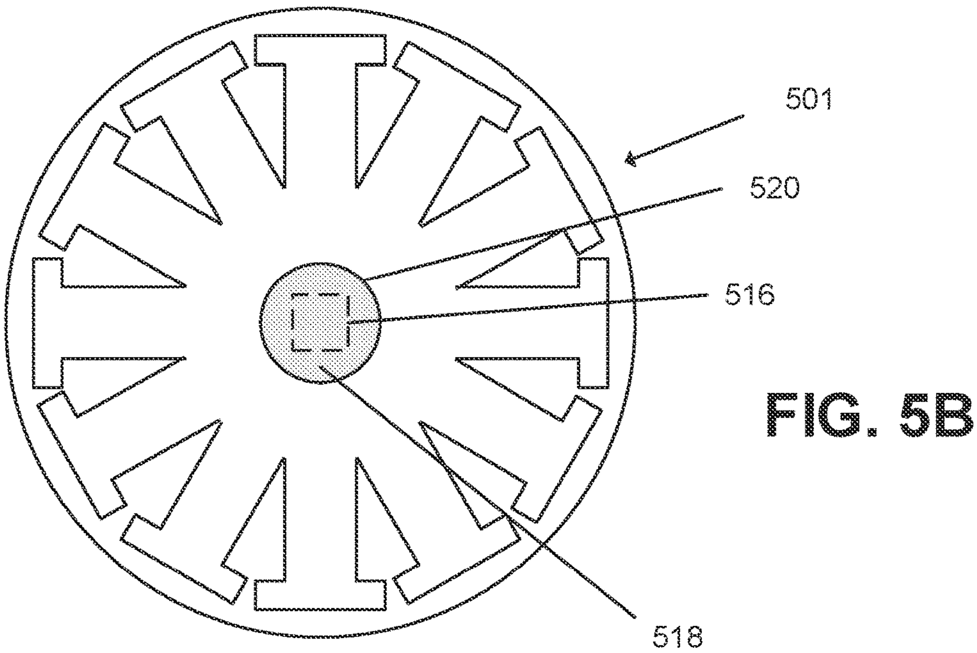
FIG. 5B is a bottom plan view of the stack.

FIG. 5A depicts a side view of a stack 500 that comprises four trays 501, 502, 503 and 504. A bolt 510 is shown in broken line form that engages a nut 512 to hold the stack together. FIG. 5B is a bottom plan view of the first tray 501. The indexed shank 514 of the bolt 510 engages the indexed hole 516 of the first tray 501. The head 518 of the bolt 510 is disposed within the indented recess 520 such that the stack 500 has a flat lower surface. A washer 508 is present around the indexed hole of the fourth tray 504. The bolt 510 may be somewhat undersized relative to the inner diameter of the indexed hole 516 such that air or other coolant (e.g. liquid nitrogen) can circulate around the bolt 510 and pass between layers.

Figure 5C:
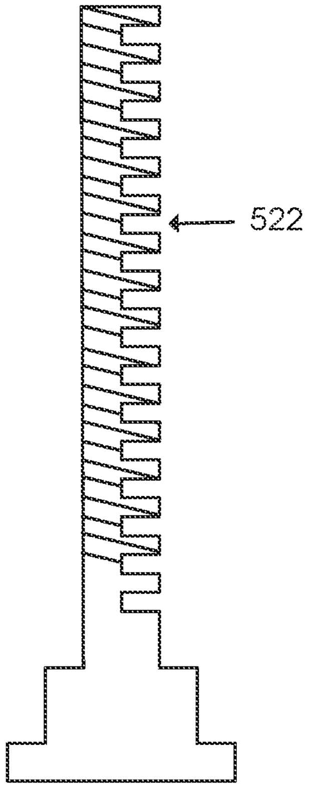
FIG. 5C shows a side plan view of a bolt with a serrated undercut section.
Figure 5D:
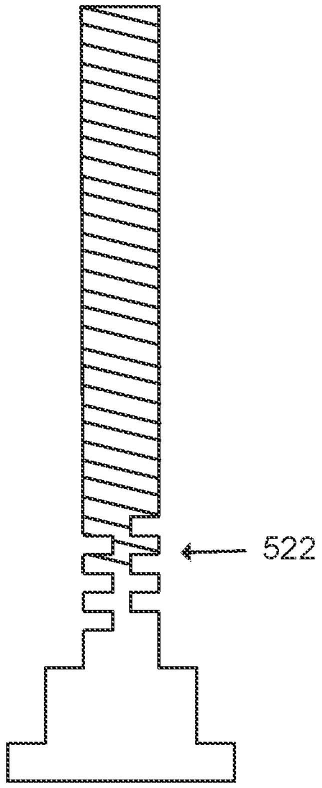
FIG. 5D shows a side plan view of another bolt with a serrated undercut section.

In one embodiment, the bolt 510 is a plastic bolt, such as a plastic carriage bolt. The plastic bolt can comply more closely with regulations while also conferring some additional advantages. In one embodiment, the bolt comprises a serrated undercut section 522 (see FIG. 5C), such that once the stack 500 is assembled, shipped, and received, the recipient needn't separate a very cold metal bolt and nut. Instead, the stack 500 can be firmly gripped and sheared sideways such that the stack 500 separates neatly at the undercut section 522. The serrated undercut section 522 reduces the thickness of the bolt at select points along its length. This weakens the bolt to make it vulnerable to shear forces while maintaining sufficient strength along its long axis. In the embodiment of FIG. 5C, the serrated undercut section 522 are disposed along the same side of the bolt. The size of the serrations is exaggerated for clarity. In another embodiment, the serrated undercut sections 522 may be on both sides of the bolt. In the embodiment of FIG. 5D, the serrated undercut sections 522 are disposed proximate the indexed shank of the bolt. The plastic bolt can then be discarded or recycled.

The trays may be formed from any conventional material that is compliant with ultra-cold temperatures, including plastics. The trays may be formed using conventional techniques such as injection molding or 3D printing. In one embodiment, each tray is sized to fit mandated shipping constraints. For example, each tray may have a diameter of less than 80 mm (e.g. 79 mm or 77 mm) such that it fits into a standard shipping canister that has an 80 mm inner diameter. The stack may be wrapped in an absorbent mat before inserting into a canister for shipment.

In the embodiment depicted in FIG. 1A and FIG. 2A, each tray accommodates twelve sample tubes in respective radial grooves. In the embodiment depicted in FIG. 1B and FIG. 2B, each try accommodates ten sample tubes in respective radial grooves. After benefitting from reading this disclosure, one skilled in the art could design storage trays that storage an alternate number of sample tubes and such alternate designs are contemplated for use with the disclosed system. In the embodiments depicted in the figures, the depth of the grooves are sized such that a gap between the trays remains. This conserves plastic, allows for slimmer trays with no loss of function, and permits coolant to circulate between the trays. For example, each of the radial grooves may have a depth such that 2.5 mm of a sample tube is disposed within a bottom radial groove and another 2.5 mm of the sample tube is disposed within a top radial groove. This would leave a gap of about 2.5 mm between the upper tray and the layer tray. Such gaps are typically between 2 mm and 3 mm. In another embodiment, the depth of the grooves are sized such that no gap between the trays remains.

To retain sample tubes, a second tray is placed atop the first tray and then rotated slightly such that the radial grooves on the underside align with the sample tubes in the lower tray. Alternatively, each tray may be flipped relative to its adjacent tray.

In use, a technician inserts one or more sample tubes into corresponding radial grooves, locks the trays into position in a stack with a bolt, and stores the stack in a freezer. Additional trays can be added to the stack as needed. The entire stack can be moved from a freezer directly into shipping materials with no manipulation. The stack can be sealed and shipped immediately.

The stack 500 locks sample tubes into position from the time they are first frozen. The stack 500 can be immersed in, for example, liquid nitrogen with the sample tubes already in place and with the stack 500 already locked into position. The trays do not need to be separated or loosened. The stack 500 stores compactly inside a laboratory freezer and can be shipped as-is.

Figure 6A:
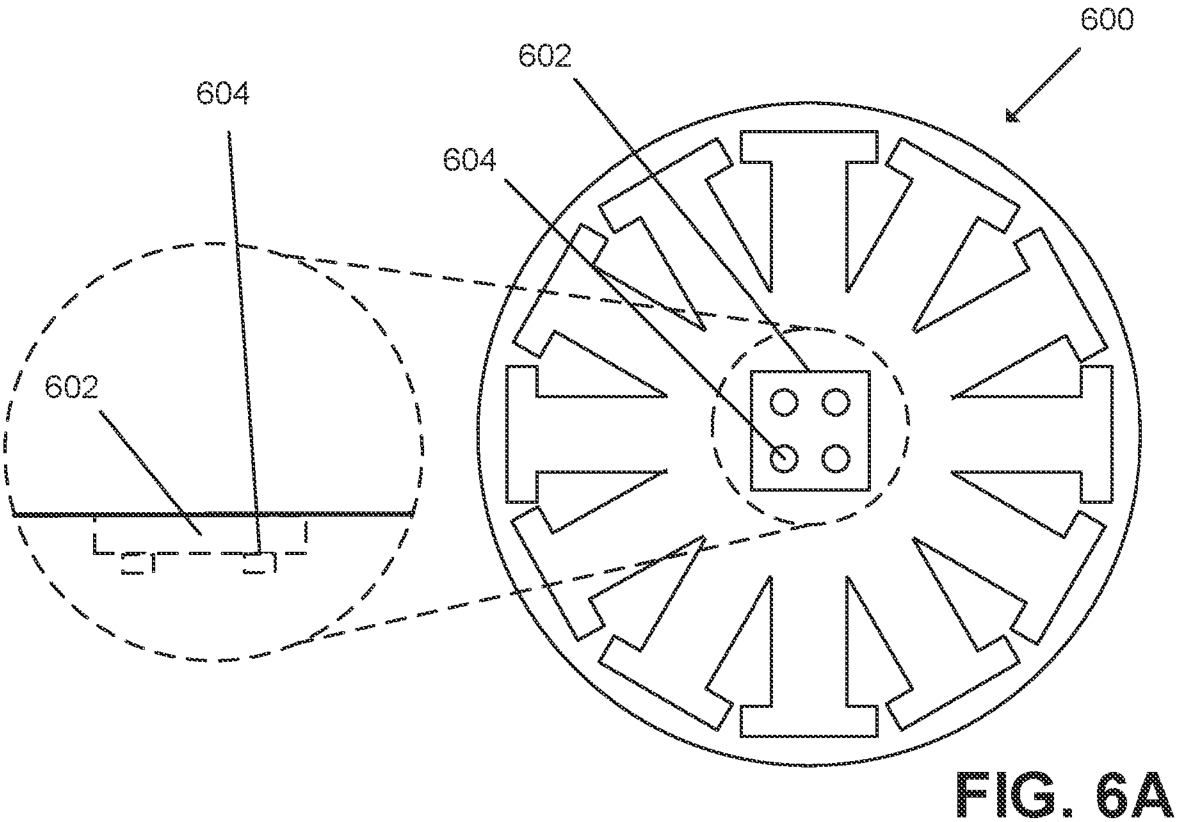
FIG. 6A is a bottom plan view of another tray.
Figure 6B:
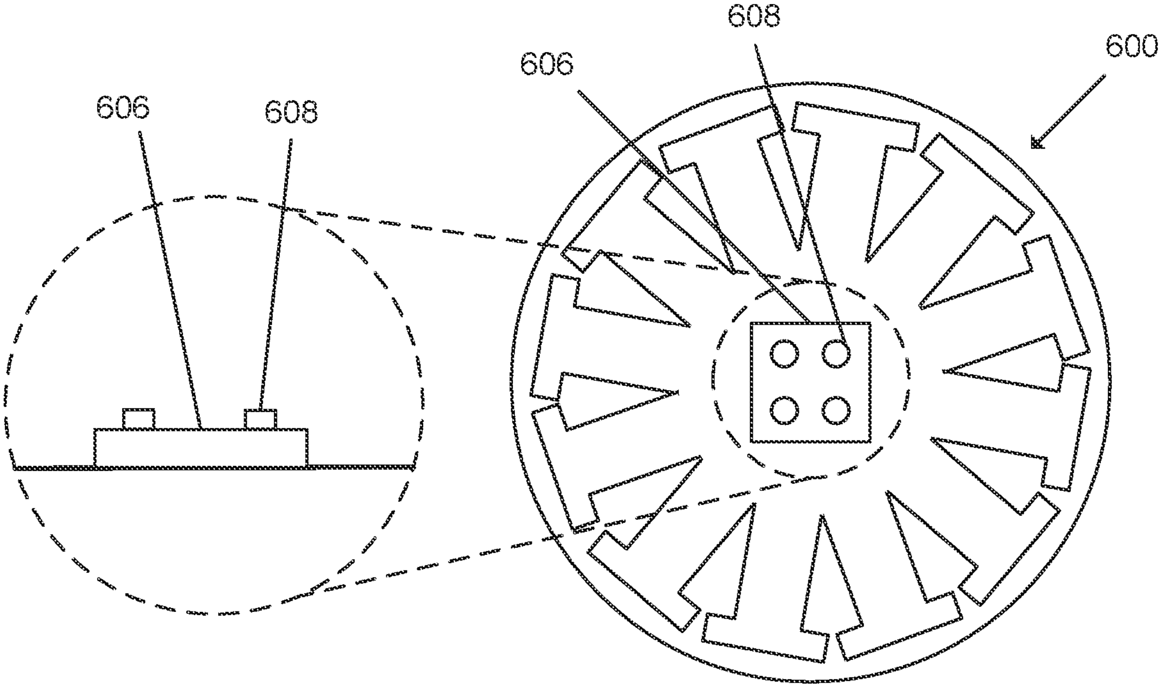
FIG. 6B is a top plan view of the tray of FIG. 6A.

FIG. 6A and FIG. 6B depicts an embodiment wherein a snap-fit connectors (LEGO® style), such as those disclosed in U.S. Pat. No. 3,005,282, are used to hold a stack together, rather than a bolt. FIG. 6A is a bottom plan view of a tray 600 that includes an indexed fastener. In FIG. 6A, the indexed fastener is an indexed recess 602 that has a least one flat edge. The indexed recess may, for example, be a recessed square or rectangle. The indexed recess 602 has at least one further-recessed receiving element 604. FIG. 6B depicts a top plan view of the tray 600 that includes an indexed protrusion 606 that is sized to mate with the indexed recess 602. The indexed protrusion 606 has at least one further-protruding insertion element 608 that is sized to mate with the receiving element 604. The resulting snap-fit connection allows multiple trays 600 to form a stack without using a bolt.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for storage and transport of biological samples, the device comprising:

a stack comprising at least a first tray and a second tray, each having a first surface with a first plurality of radial grooves and a second surface, opposite the first surface, with a second plurality of radial grooves, each radial groove terminating in a perpendicular groove that is perpendicular to a longitudinal axis of a corresponding radial groove in the plurality of radial grooves.

2. The device as recited in claim 1, wherein each perpendicular groove is deeper than a corresponding radial groove in the plurality of radial grooves.

3. The device as recited in claim 1, further comprising at least one Eppendorf tube disposed between, and contiguous with, the first tray and the second tray such that the at least one Eppendorf tube is retained within a radial groove within the plurality of radial grooves.

4. The device as recited in claim 1, further comprising an indexed fastener with at least one flat edge, the indexed faster selected from a group consisting of an indexed hole and an indexed recess and an indexed protrusion.

5. The device as recited in claim 4, wherein the first plurality of radial grooves is vertically offset from the second plurality of radial grooves such that the first plurality of radial grooves and the second plurality of radial grooves do not vertically align.

6. The device as recited in claim 1, wherein the first tray and the second tray are circular discs.

7. The device as recited in claim 1, wherein the first tray and the second tray each have a diameter that is less than 80 mm.

8. The device as recited in claim 1, wherein the first tray and the second tray each further comprise a respective indexed hole with at least one flat edge, each indexed hole being disposed at a center of the respective tray, wherein the plurality of radially grooves extend radially from the respective center of the respective tray.

9. The device as recited in claim 8, further comprising a bolt extending through the respective indexed hole of the first tray and the second tray.

10. The device as recited in claim 9, wherein the bolt comprises an indexed shank with at least one flat edge.

11. The device as recited in claim 10, further comprising a nut that is mated with the bolt.

12. The device as recited in claim 11, further comprising a washer that is contiguous with the nut and the bolt.

13. A tray for storage and transport of biological samples, the tray comprising a first surface with a first plurality of radial grooves and a second surface, opposite the first surface, with a second plurality of radial grooves, each radial groove terminating in a perpendicular groove that is perpendicular to a longitudinal axis of a corresponding radial groove in the plurality of radial grooves.

14. The tray as recited in claim 13, wherein the tray is a circular disc.

15. The tray as recited in claim 13, wherein the first plurality of radial grooves is vertically offset from the second plurality of radial grooves such that the first plurality of radial grooves and the second plurality of radial grooves do not vertically align.

16. The tray as recited in claim 15, wherein the tray further comprises an indexed hole with at least one flat edge, the indexed hole being disposed at a center of the tray, wherein the plurality of radially grooves extend radially from the center of the tray.

* * * * *